A. H. NEULAND.
ELECTROMAGNETIC TRANSMISSION.
APPLICATION FILED JAN. 18, 1916.
1,298,376.
Patented Mar. 25, 1919.
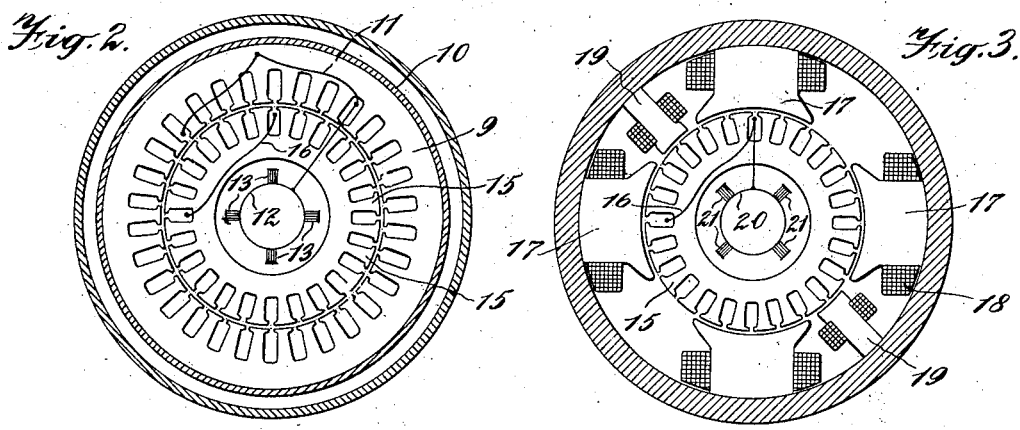
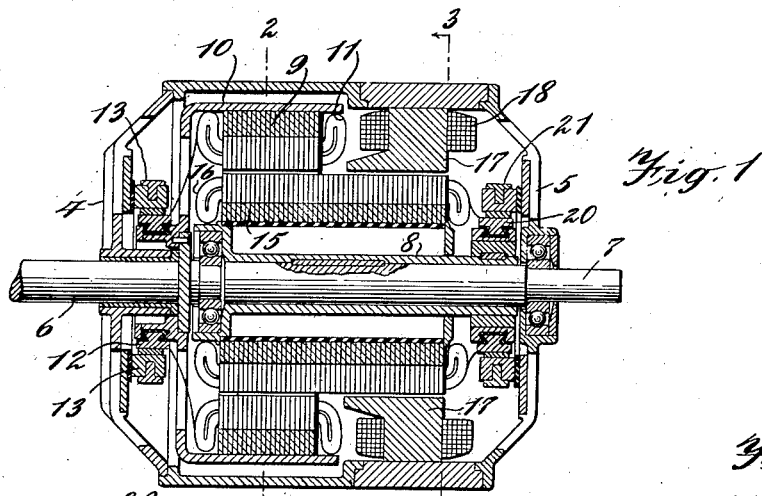
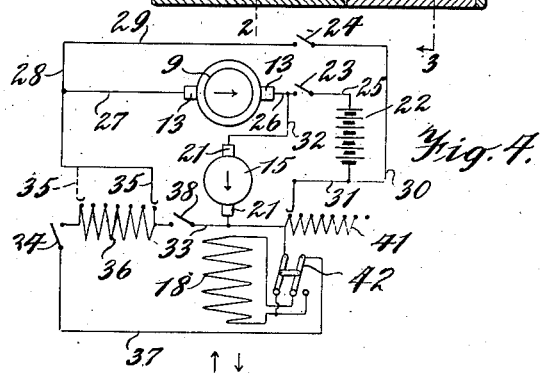
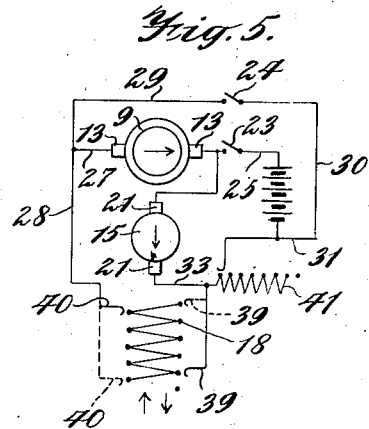
INVENTOR
Alfons H. Neuland
BY
Rosenbaum, Stockbridge & Borst
ATTORNEYS

UNITED STATES PATENT OFFICE.

ALFONS H. NEULAND, OF NEW YORK, N. Y.

ELECTROMAGNETIC TRANSMISSION.

1,298,376.   Specification of Letters Patent.   Patented Mar. 25, 1919.

Application filed January 18, 1916. Serial No. 72,663.

*To all whom it may concern:*

Be it known that I, ALFONS H. NEULAND, a subject of the Czar of Russia, residing at the city of New York, in the borough of Manhattan and State of New York, have invented certain new and useful Improvements in Electromagnetic Transmission, of which the following is a full, clear, and exact description.

My invention relates to dynamo-electric machines, and an object of my invention is to produce such a machine which is capable of operating as an electro-magnetic power transmission device for transmitting power from one rotating element, such as a shaft, to another rotatable element. One of the especial objects of my invention is to produce an electro-magnetic power transmission device which has one or more of certain characteristics. For instance, one that is capable of exerting a greater pull than the applied torque; one in which the driven element may be caused to rotate with or against the driver; one in which the speed of the driven element may exceed that of the driver; one which is self-exciting and will act to charge a storage battery; and one which in its capacity as a motor may be utilized to start or crank a prime mover which is not self-starting. Another object is economy in size and weight. Other objects are simplicity of construction and facility of control and manipulation. Still other objects and advantages of my invention will appear from the following description.

In accordance with my invention, I employ two rotatable armatures in inductive relation to each other, each armature including a commutator, together with stationary brushes on each commutator arranged so that each armature also serves as a field for the other. The stationary brushes are in electrical quadrature or electrically at right angles to each other, whereby when one armature is driven operating as a generating element, the other armature is caused to rotate as a motor element.

The power transmission device comprises two coöperative rotatable elements which are acted upon and traversed by a stationary field which generates a current in one of the elements when the said element is rotated, this current being fed into the other element which consumes it and thereby operates as a motor. With a uniform field strength, since the field is stationary, the potential generated in the driving armature is obviously proportional to the speed of the driving armature, and the counter potential of the motor element is also proportional to the speed of said element. Therefore, when the number of turns on both elements is the same, the motor armature may approximate the speed of the generating element, and when the number of turns on the motor element is less than that of the generator element, the speed of the former may exceed that of the latter; an advantage not characteristic of the well-known so-called magnetic clutches.

As a means for varying the counter potential and the torque of the driven armature, my invention also comprehends an additional adjustable field acting on the driven armature, by means of which the motor counter potential at any given speed thereof may be varied, thereby increasing or decreasing the current and torque at such speed and causing a corresponding change in the speed of the driven armature. My invention also comprehends means for reversing the direction of the additional field and generating a boosting potential in the driven armature, whereby the driven armature, with the same number of turns as that on the driving armature, may be made to rotate at several times the speed of the latter.

My invention also comprehends various other features of construction and arrangements and combinations of elements as will hereinafter more fully appear.

I shall now describe the illustrated embodiment of my invention and shall thereafter point out my invention in claims.

Figure 1 is a central sectional elevation of a machine embodying my invention;

Figs. 2 and 3 are transverse sections of the same on lines 2—2 and 3—3, respectively, showing diagrammatically the respective commutators and brushes;

Fig. 4 is a diagram of the electrical circuits; and

Fig. 5 is a diagram of a modified circuit arrangement.

I shall describe the illustrated embodiment of my invention as an engine starter and transmission for automobiles. The mechanism is inclosed in a suitable housing or casing having end brackets 4 and 5, respectively, the former being provided with a central hub portion forming a bearing for the engine or driving shaft 6, and the latter having a central hub portion forming a bearing for the driven shaft 7 which is directly connected to the drive shaft of the automobile. A sleeve 8 which fits around and is splined to the driven shaft 7, has its inner end enlarged to form a ball race within which the inner end of the engine shaft 6 bears.

An external rotatable armature 9, which in this embodiment serves as the driving armature, is secured to and rotated with the engine shaft 6, being attached to the inner periphery of a cup-shaped bracket member 10, which in turn is secured, as by screws, to a flange on the engine shaft 6, as shown. A driving armature winding 11 is arranged in slots in the inner periphery of the armature and is wound to form four poles, the span of each pole winding being shown diagrammatically in Fig. 2. A rotative commutator 12 of the driving armature is also carried by the engine shaft 6, being shown as carried upon an annular flange on the bracket 10, and the driving armature winding 11 is connected to the commutator 12, as indicated. Four equally spaced stationary brushes 13 wipe the commutator 12, these brushes being attached to the end bracket 4 of the stationary housing.

The driving armature 9 closely surrounds an inner armature 15, which in this embodiment serves as the driven armature and is secured to the sleeve 8 of the driven shaft 7. A driven armature winding 16 is arranged in slots in the outer periphery of the armature 15, being also wound for four poles, the span of each pole winding being shown in Figs. 2 and 3. The windings of the two armatures are thus in inductive relation. The length of the driven armature 15 is proportioned to extend axially some distance beyond the internal driving armature 9, and a stationary field element closely surrounds the protruding portion of the inner armature. The stationary field element has four main poles 17 carrying field coils 18, and two commutating poles 19 to insure good commutation.

The commutator 20 of the driven armature is carried by the driven shaft 7, the driven armature winding 16 being electrically connected thereto as indicated, and four equally spaced stationary brushes 21 wipe the commutator 20, the brushes being attached to and carried by the side bracket 5 of the housing.

The driving armature brushes 13 are arranged in line with the four poles 17 of the stationary field element and in planes intermediate those of the driven armature brushes 21, as shown in Figs. 2 and 3. That is, they are so arranged that a current flowing through the brushes in the external armature will create field poles which are alined with the main poles of the stationary field element, while a current flowing through the brushes of the internal armature will set up field poles which are in electrical space quadrature or electrically at right angles to the field poles of the external armature and to the main poles of the stationary field element. For illustrative purposes the brushes 13 and 21 appear in Fig. 1 in the same planes, it being noted that the brushes of one set would not appear in this section if the representation were strictly accurate in this respect.

The brushes 13 are conductively connected to the brushes 21, and this circuit is arranged to include the magnet windings 18 of the stationary field element. The storage battery 22 is arranged to be connected across the terminals of the internal or driven armature. This circuit arrangement is illustrated in Fig. 4. The connection of the storage battery 22 into the circuit of the internal armature 15 is controlled by a switch 23. For cranking purposes, the storage battery 22 is also arranged to energize the winding of the external armature 9 through a circuit which is controlled by the switch 24. To crank the engine the switches 23 and 24 are simultaneously closed. The current from the battery 22 then flows through the winding of the external armature 9 through the following circuit: wire 25, contact 23, wire 26, brush 13, windings of armature 9, brush 13 of opposite polarity, wires 27, 28 and 29, contact 24, wires 30 and 31, back to the battery. At the same time a current from the battery 22 energizes the windings of armature 15 through the following circuit: wire 32, brush 21, windings of armature 15, brush 21 of opposite polarity, wire 33, and wire 31, back to the battery.

Both armatures now act as motor elements and tend to rotate in opposite directions, but since the shaft 7, and hence the inner armature 15, is locked against rotation by the brakes of the automobile, the outer armature 9 alone rotates and cranks the engine. The switches 23 and 24 are then opened.

The outer armature 9 is now rotated by the engine and serves as a generating element. To start the automobile the battery switch 23 is closed, permitting the battery current to flow through the inner armature which sets up a magnetic field therein. The rotation of the generator element 9 against this field serves to generate a potential in the generating element, and when the circuit of the generating element is closed, a current flows which produces a motor action in the inner armature 15. As a first step, the generator circuit is closed through the switch 34, the lever 35 of a rheostat being in the position shown in full lines in Fig. 4 so as to connect all of the resistance 36 into the circuit. The current which is generated in the external armature 9 passes through the brushes into the inner armature 15 and builds up strong stationary field poles therein, causing the current to become very strong. Each armature, therefore, provides a stationary field for the other and the external armature exerts a torque on the internal armature, forcing the latter to rotate as the armature of a motor, the field of the armatures remaining stationary due to the non-rotation of the brushes.

In this first position, the generated current also passes through the windings 18 of the stationary field element. The circuit of this generated current may be traced as follows: from the generator element 9 through brush 13, wire 32, brush 21, motor element 15, brush 21 of opposite polarity, wire 33, pole changer 42, coils 18, wire 37, switch 34, resistance 36, lever 35 and wires 28 and 27 back to the brush 13 of opposite polarity.

The rotation of the inner armature 15 as a motor against the stationary field of the armature 9, generates a potential therein which is counter to the potential generated in the armature 9; but since each of the two armatures provides a stationary field for the other, the generated potential of the outer armature is not changed by the rotation of the inner armature, and hence the generated potential of the outer armature is affected only by the latter's rotation and not by the rotation of the inner armature, and similarly the counter potential of the inner armature is affected only by the latter's rotation and not by the rotation of the outer armature. Thus, the outer armature also serves as a motor field and the inner armature similarly serves as a generator field.

As stated above, with the same number of turns on both armatures, the motor counter potential will equal the generated potential when the two armatures rotate at equal speeds and in the same direction; and by providing the inner armature with fewer turns than the outer, the former, although it is the driven element, is made to rotate at a higher speed than the driver before the counter potential equals the generated potential.

The motor counter potential at any given speed of the inner armature may be varied by means of the adjustable field of the stationary field element, thereby changing the speed of the driven element. Assuming the turns on both armatures to be the same and the field windings 18 of the stationary field element connected in series with the two armatures, as above described, the rotating external driving armature 9 will exert a direct torque on the inner driven armature 15, and the stationary field element will produce another torque on the inner armature 15, as a result of which the torque of the driven armature will greatly exceed that of the driver; likewise due to the additional flux from the stationary field element through the inner armature, the counter potential will equal the generated potential when the inner armature is rotating at a much lower speed than would otherwise be the case. To obtain an increase in the speed of the latter, I provide means for weakening the field magnets 17, either by shunting part of the current away from them or by cutting out some of their turns, whereupon the inner armature speed will immediately increase, and when the strength of the field poles 17 have been reduced to zero, the speed of the inner armature will substantially equal the driver speed. In the diagram of Fig. 4, the switch 38 is closed to shunt some of the current away from the stationary field poles, and the resistance of the field circuit is varied by adjusting the lever 35, which serves to include more or less of the coils of the resistance 36 into the stationary field circuit; or as an alternative arrangement, the means shown in the diagram of Fig. 5 may be employed to vary the field turns of the stationary field poles. In the latter construction, adjustable levers 39 and 40 may be employed. At start the levers 39 and 40 are in the position shown in dotted lines, giving the maximum field strength for forward rotation; and the lever 39 is moved down and the lever 40 is moved up, an increasing number of field turns being cut out as the levers approach each other.

In order to make the driven armature 15 run faster than the driver, means are also provided for reversing the field windings of the stationary field element and for gradually applying the current to the reversed windings, which serves to still further reduce the resultant counter potential of the driven armature, since, under these conditions, the right side of the inner armature now also acts as a generator, while the left side continues to operate as the motor. In the diagram of Fig. 4, the means for reversing the field consists of the pole changer 42, while the field is reversed by the arrangement shown in Fig. 5 by continuing the movement of the levers 39 and 40 past the middle position, although a pole changer might also be employed in this construction for the purpose. The movement of the levers to the position shown in dotted lines serves to gradually strengthen the reversed field current.

By these means when the current in the reversed field is strong, the driven armature may rotate at a speed several times that of the driver. It is to be noted in this connection that a portion of the torque transmitted from the external to the internal armature is expended for the generation of the boosting potential in the inner armature by the stationary field poles of the stationary field element. Since this boosting potential causes the inner armature to rotate at a higher speed, the power transmitted from the driver to the driven element remains substantially the same.

It has heretofore been pointed out that the potential of the continuously rotating outer armature 9 remains constant irrespective of the rotation of the inner armatures so long as the current in the inner armature remains constant. The battery 22 which is connected across the terminals of the inner armature can therefore be charged at any speed of the driven armature 15, the charging action being affected only by the current and torque of the driven armature. Therefore, when the current in the inner armature drops below the minimum at which the generated potential equals that of the battery, the battery automatically begins to discharge and strengthen the generated field in the inner armature, and thus prevents the device from becoming de-magnetized or changing its polarity.

As above stated, the magnet windings 18 are connected in series into the generator circuit at the start of the device, and the resistance 36 is also switched in series with the field to prevent a too rapid building-up of the current. Referring to the diagram of Fig. 4, when starting the driven element, the lever 35 is in the position shown in full lines and the switch 34 is closed. To speed up, the lever 35 is gradually moved to the extreme left and the switch 38 is then closed, and the lever 35 again moved to the extreme right, eliminating all of the resistance 36 from the branch of the circuit including the armatures and inserting the maximum resistance in the field, whereupon the switch 34 is moved to the off-point. To still further increase the speed, the field is reversed by means of the pole changer 36 and the field current gradually applied by closing the switch 34 and moving the lever 35 to the left.

This same result is accomplished with the arrangement shown in Fig. 5 by manipulating the levers 39 and 40 in the manner above pointed out. The movement of the levers from the position shown in dotted lines, which is the starting position, to the position shown in full lines, serves first to weaken the field strength and then to reverse the polarity of the field poles and again to gradually increase the field strength, thus still further increasing the speed of the driven element.

A resistance 41 may be employed to regulate the charging current to the battery 22; or this regulation may be obtained in any other suitable way.

From the above it will appear that with a constant applied torque and with the number of turns on the two armatures equal, the torque of the driven element exceeds that of the driver so long as the speed of the driven element is less than that of the driver; and that the torque of one is equal to the torque of the other when the speeds are substantially the same and the poles of the stationary field element are inactive; and the torque of the driven element is less than the driver torque when the speed of the former exceeds the speed of the latter and the field of the stationary field element is active in a reverse direction; in other words, that power of a constant torque and speed is convertible into a variable torque and speed.

The driven element may be made to rotate against the driver by proportioning the device so that the stationary field poles will exert a much stronger torque on the inner armature than does the driving element and by causing the stationary field poles under this condition to pull in the reverse direction. It will also readily be seen that the device may be so proportioned that without any mechanical lock for the inner armature, such as the brakes or inertia of an automobile, the stationary field poles may be made to exert sufficient torque in the reverse direction to lock the inner armature against rotation when the two armatures operate as motors.

Manifestly the inner armature may serve as the driver and the outer armature as the driven, and for many purposes this operation will be preferable. My invention in no wise depends upon which armature serves as the driver and which as the driven.

It is obvious that various modifications may be made in the construction shown in the drawings and above particularly described, within the principle and scope of my invention.

I claim:

1. A dynamo-electric machine comprising a driven rotative armature, a driving rotative armature immediately opposing the driven armature, whereby each acts as the field for the other, and a stationary field element in coöperative relation with the driven armature, the windings of the two armatures and of the field element being arranged to be electrically connected.

2. A dynamo-electric machine comprising a driven rotative armature, a driving rotative armature immediately opposing the driven armature, whereby each acts as the field for the other, a stationary field element in coöperative relation with the driven armature, the windings of the two armatures and of the field element being arranged to be electrically connected, and means for altering the strength of the magnetic field of the field element.

3. A dynamo-electric machine comprising a driven rotative armature, a driving rotative armature in inductive relation to the driven armature, a stationary field element in coöperative relation with the driven armature, the windings of the two armatures and of the field element being arranged to be electrically connected, and means for altering the strength and direction of the magnetic field of the field element.

4. A dynamo-electric machine comprising a driven rotative armature and a driving rotative armature, the windings of the two armatures immediately opposing each other, whereby each acts as the field for the other, a rotative commutator for each armature connected to the winding thereof, stationary brushes wiping each commutator, and a stationary field element in coöperative relation with the driven armature, the brushes of one armature being conductively connected with those of the other making a closed circuit and said circuit being arranged to include the magnet windings of the field element.

5. A dynamo-electric machine comprising a driven rotative armature and a driving rotative armature, the windings of the two armatures immediately opposing each other, whereby each acts as the field for the other, a rotative commutator for each armature connected to the winding thereof, stationary brushes wiping each commutator, a stationary field element in coöperative relation with the driven armature, the brushes of one armature being conductively connected with those of the other making a closed circuit and said circuit being arranged to include the magnet windings of the field element, and means for altering the strength of the magnetic field of the field element.

6. A dynamo-electric machine comprising a driven rotative armature and a driving rotative armature, the windings of the two armatures being in inductive relation, a rotative commutator for each armature connected to the winding thereof, stationary brushes wiping each commutator, a source of magnetizing current arranged to be connected across the terminals of the driven armature, a stationary field element in coöperative relation with the driven armature, the brushes of one armature being conductively connected with those of the other making a closed circuit and the magnet windings of the field element being arranged to be included in the circuit with the armature windings, and means for altering the strength of the magnetic field of the field element.

7. A dynamo-electric machine comprising a driven rotative armature and a driving rotative armature having their windings arranged in inductive relation, a rotative commutator for each armature connected to the winding thereof, stationary brushes wiping each commutator, the brushes of one armature being conductively connected with those of the other forming a complete circuit and being angularly arranged in planes intermediate those of the other, and a stationary field element in inductive relation with the driven armature and having its poles alined with those of the driving armature, the magnet windings of the field element being arranged to be included in the said circuit.

8. A dynamo-electric machine comprising a driven rotative armature and a driving rotative armature having their windings arranged in inductive relation, a rotative commutator for each armature connected to the winding thereof, stationary brushes wiping each commutator, the brushes of one armature being conductively connected with those of the other forming a complete circuit and being angularly arranged in planes intermediate those of the other, thereby forming a stationary field traversing the two armatures, and a stationary field element in coöperative relation with the driven armature and having its poles alined with those of the driving armature, the magnet windings of the field element being arranged to be included in the armature circuit.

9. A dynamo-electric machine comprising a driven rotative armature and a driving rotative armature having their windings arranged in inductive relation, a rotative commutator for each armature connected to the winding thereof, stationary brushes wiping each commutator, the brushes of one armature being conductively connected with those of the other forming a complete circuit and being angularly arranged in planes intermediate those of the other, thereby forming two stationary magneto-motive forces in electrical space quadrature to each other, and a stationary field element in coöperative relation with the driven armature and having its poles alined with those of the driving armature, the magnet windings of the field element being arranged to be connected into the said circuit, and means for varying the strength of the magnetic field of the field element.

10. A dynamo-electric machine comprising a driven rotative armature and a driving rotative armature having their windings arranged in inductive relation, a rotative commutator for each armature connected to the winding thereof, stationary brushes wiping each commutator, the brushes of one armature being conductively connected with those of the other forming a complete circuit and being angularly arranged in planes intermediate those of the other, thus forming in the two armatures stationary magneto-motive forces in electrical space quadrature to each other coupling the two armatures, a stationary field element in coöperative relation with the driven armature and having its poles alined with those of the driving armature, the magnet windings of the field element being arranged to be included in the armature circuit, and means for altering the strength and direction of the magnetic field of the field element.

11. A dynamo-electric machine comprising a driven shaft having a driven armature thereon, a driving shaft axially alined with the driven shaft and having a driving armature thereon closely surrounding a portion of the driven armature, a commutator for each armature carried by the respective shaft and connected with the winding of the respective armature, stationary brushes wiping each commutator, the brushes of one armature being conductively connected with those of the other armature and being angularly arranged in planes intermediate those of the other armature, and a stationary field element closely surrounding another portion of the driven armature and arranged with its poles alined with those of the driving armature, the magnet windings of the field element being arranged to be included in the circuit with the two armature windings.

12. A dynamo-electric machine comprising a driven shaft having a driven armature thereon, a driving shaft axially alined with the driven shaft and having a driving armature thereon closely surrounding a portion of the driven armature, a commutator for each armature carried by the respective shaft and connected with the winding of the respective armature, stationary brushes wiping each commutator, the brushes of one armature being conductively connected with those of the other armature and being angularly arranged in planes intermediate those of the other armature, a source of magnetizing current arranged to be connected across the terminals of the driven armature, a stationary field element closely surrounding another portion of the driven armature and arranged with its poles alined with those of the driving armature, the magnet windings of the field element being arranged to be connected into the circuit with the two armature windings, and means for altering the strength and direction of the magnetic field of the field element.

13. A dynamo-electric machine comprising a driven shaft having a driven armature thereon, a driving shaft axially alined with the driven shaft and having a driving armature thereon closely surrounding a portion of the driven armature, a commutator for each armature carried by the respective shaft and connected with the winding of the respective armature, stationary brushes wiping each commutator, the brushes of one armature being conductively connected with those of the other armature and being angularly arranged in planes intermediate those of the other armature, a stationary field element closely surrounding another portion of the driven armature and arranged with its poles alined with those of the driving armature, the magnet windings of the field element being arranged to be included in the circuit with the two armature windings, and a battery adapted to be connected across the terminals of one armature to magnetize the armatures when operating on light loads and to receive a charge when operating on heavy load.

14. A dynamo-electric machine comprising a driven shaft having a driven armature thereon, a driving shaft axially alined with the driven shaft and having a driving armature thereon closely surrounding a portion of the driven armature, a commutator for each armature carried by the respective shaft and connected with the winding of the respective armature, stationary brushes wiping each commutator, the brushes of one armature being conductively connected with those of the other armature and being angularly arranged in planes intermediate those of the other armature, a stationary field element closely surrounding another portion of the driven armature and arranged with its poles alined with those of the driving armature, the magnet windings of the field element being arranged to be included in the circuit with the two armature windings, and a source of electric current adapted to magnetize both armatures and produce a torque upon the two armatures in opposite directions.

15. A dynamo-electric machine comprising a driven shaft having a driven armature thereon, a driving shaft axially alined with the driven shaft and having a driving armature thereon closely surrounding a portion of the driven armature, a commutator for each armature carried by the respective shaft and connected with the winding of the respective armature, stationary brushes wiping each commutator, the brushes of one armature being conductively connected with those of the other armature and being angularly arranged in planes intermediate those of the other armature, a source of electric current adapted to magnetize both armatures and produce a torque upon the armatures, and means for locking one armature against rotation.

16. A dynamo-electric machine comprising a single driven rotative armature, a driving rotative element surrounding a portion of the driven armature and having a winding in inductive relation with that of the driven armature, and a stationary field element surrounding another portion of the driven armature in coöperative relation therewith.

17. A dynamo-electric machine comprising a rotative armature arranged to be driven by a prime mover, another rotative armature immediately opposing the first armature and arranged to be connected to a mechanical load, whereby each armature acts as the field for the other, and a stationary field element in coöperative relation with one of the armatures, the windings of the two armatures and of the field element being arranged to be electrically connected.

18. A dynamo-electric machine comprising a rotative armature arranged to be driven by a prime mover, another rotative armature immediately opposing the first armature and arranged to be connected to a mechanical load, whereby each armature acts as the field for the other, a stationary field element in coöperative relation with one of the armatures, the windings of the two armatures and of the field element being arranged to be electrically connected, and means for altering the strength of the magnetic field of the field element.

19. A dynamo-electric machine comprising a driven rotative armature and a driving rotative armature, the windings of the two armatures being in immediate opposition, whereby one acts as the field for the other, a rotative commutator for each armature connected to the winding thereof, stationary brushes wiping each commutator, and a stationary field element in coöperative relation with one of the armatures, the brushes of one armature being conductively connected with those of the other making a closed circuit and said circuit being arranged to include the magnet windings of the field element.

20. A dynamo-electric machine comprising a driven rotative armature and a driving rotative armature, the windings of the two armatures being in inductive relation, a rotative commutator for each armature connected to the winding thereof, stationary brushes wiping each commutator, a source of magnetizing current arranged to be connected across the terminals of one of the armatures, a stationary field element in coöperative relation with one of the armatures, the brushes of one armature being conductively connected with those of the other making a closed circuit and the magnet windings of the field element being arranged to be included in the circuit with the armature windings, and means for altering the strength of the magnetic field of the field element.

21. A dynamo-electric machine comprising a driven rotative armature and a driving rotative armature having their windings arranged in inductive relation, a rotative commutator for each armature connected to the winding thereof, stationary brushes wiping each commutator, the brushes of one armature being conductively connected with those of the other forming a complete circuit and being angularly arranged in planes intermediate those of the other, thereby forming a stationary field traversing the two armatures, and a stationary field element in coöperative relation with one of the armatures and having its poles alined with those of the other armature, the magnet windings of the field element being arranged to be included in the armature circuit.

22. A dynamo-electric machine comprising a driven shaft having a driven armature thereon, a driving shaft axially alined with the driven shaft and having a driving armature thereon, one of the armatures closely surrounding a portion of the other armature, a commutator for each armature carried by the respective shaft and connected with the winding of the respective armature, stationary brushes wiping each commutator, the brushes of one armature being conductively connected with those of the other armature and being angularly arranged in planes intermediate those of the other armature, and a stationary field element closely surrounding another portion of the second armature and arranged with its poles alined with those of the first armature, the magnet windings of the field element being arranged to be included in the circuit with the two armature windings.

In witness whereof I subscribe my signature in the presence of two witnesses.

ALFONS H. NEULAND.

Witnesses:
WALDO M. CHAPIN,
JULE E. ZELENKO.